(12) United States Patent
Kikuchi

(10) Patent No.: US 8,937,728 B2
(45) Date of Patent: Jan. 20, 2015

(54) IMAGE PROCESSING APPARATUS, SERVER APPARATUS, METHODS FOR CONTROLLING DISPLAYS OF THE APPARATUSES, AND STORAGE MEDIUM

(75) Inventor: Koji Kikuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 13/315,185

(22) Filed: Dec. 8, 2011

(65) Prior Publication Data

US 2012/0154840 A1 Jun. 21, 2012

(30) Foreign Application Priority Data

Dec. 17, 2010 (JP) ................................. 2010-282230

(51) Int. Cl.
*G06F 15/00* (2006.01)
*G06K 1/00* (2006.01)
*G06F 3/12* (2006.01)
*H04N 1/00* (2006.01)

(52) U.S. Cl.
CPC ....... *H04N 1/00127* (2013.01); *H04N 1/00222* (2013.01); *H04N 1/00344* (2013.01); *H04N 1/00352* (2013.01); *H04N 1/00389* (2013.01); *H04N 1/00464* (2013.01); *H04N 2201/0084* (2013.01); *H04N 2201/0094* (2013.01); *H04N 2201/3205* (2013.01); *H04N 2201/3207* (2013.01); *H04N 2201/3235* (2013.01)
USPC ........................... 358/1.13; 358/1.15; 358/1.9

(58) Field of Classification Search
None
See application file for complete search history.

(56) References Cited

U.S. PATENT DOCUMENTS

| 2001/0050782 | A1* | 12/2001 | Niitsuma et al. .............. 358/1.15 |
| 2006/0232795 | A1* | 10/2006 | Tsuboi et al. .................. 358/1.2 |
| 2008/0043137 | A1  | 2/2008  | Rikima |
| 2009/0190165 | A1  | 7/2009  | Yoshida |
| 2009/0279138 | A1* | 11/2009 | Oba .............................. 358/1.15 |
| 2009/0296133 | A1* | 12/2009 | Kawabushi et al. ......... 358/1.15 |
| 2010/0053676 | A1  | 3/2010  | Sugimoto |
| 2010/0318902 | A1  | 12/2010 | Yoshida |
| 2011/0216347 | A1* | 9/2011  | Kikuchi ........................ 358/1.14 |
| 2011/0261398 | A1* | 10/2011 | Mihara et al. ................ 358/1.15 |

FOREIGN PATENT DOCUMENTS

| CN | 101123664 A   | 2/2008  |
| CN | 101094281 A   | 12/2008 |
| JP | 2008-003833 A | 1/2008  |

* cited by examiner

*Primary Examiner* — Ming Hon
(74) *Attorney, Agent, or Firm* — Canon USA, Inc., I.P. Division

(57) ABSTRACT

An image processing apparatus determines whether to execute an image processing function indicated by an execution instruction based on a state of a web browser when the received execution instruction indicates a local use, and executes the image processing function indicated by the execution instruction irrespective of the state of the web browser when the received execution instruction indicates a remote use.

7 Claims, 18 Drawing Sheets

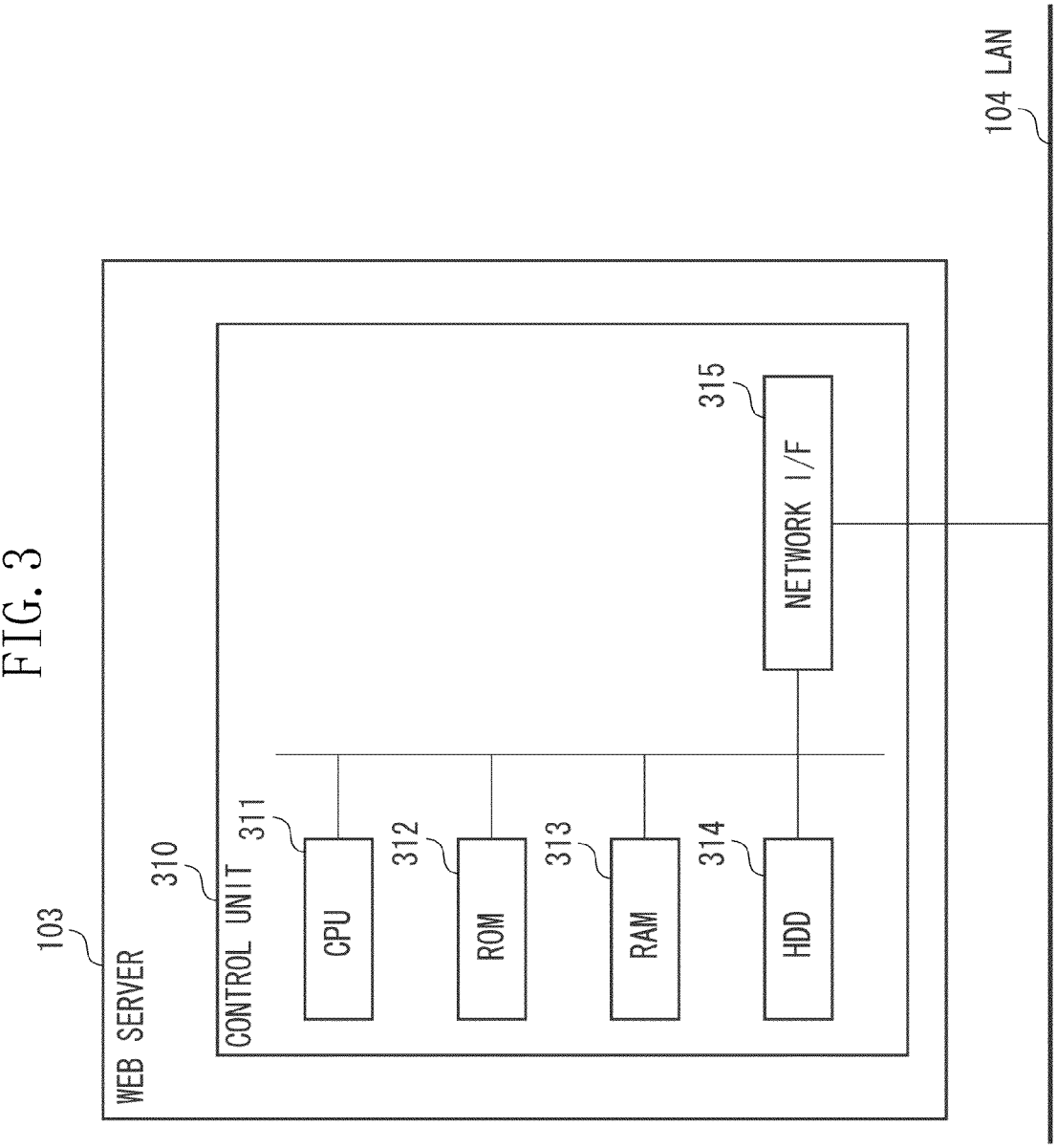

FIG. 6

| MFP | REMOTELY USABLE IMAGE PROCESSING FUNCTION |
|---|---|
| MFP 101 | Print |
| MFP 102 | Print, FAX |

600 MANAGEMENT LIST

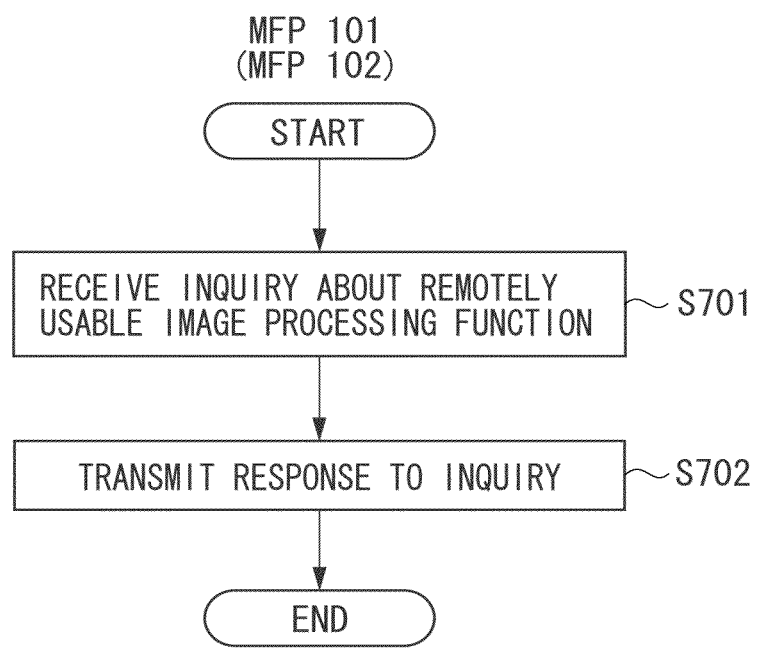

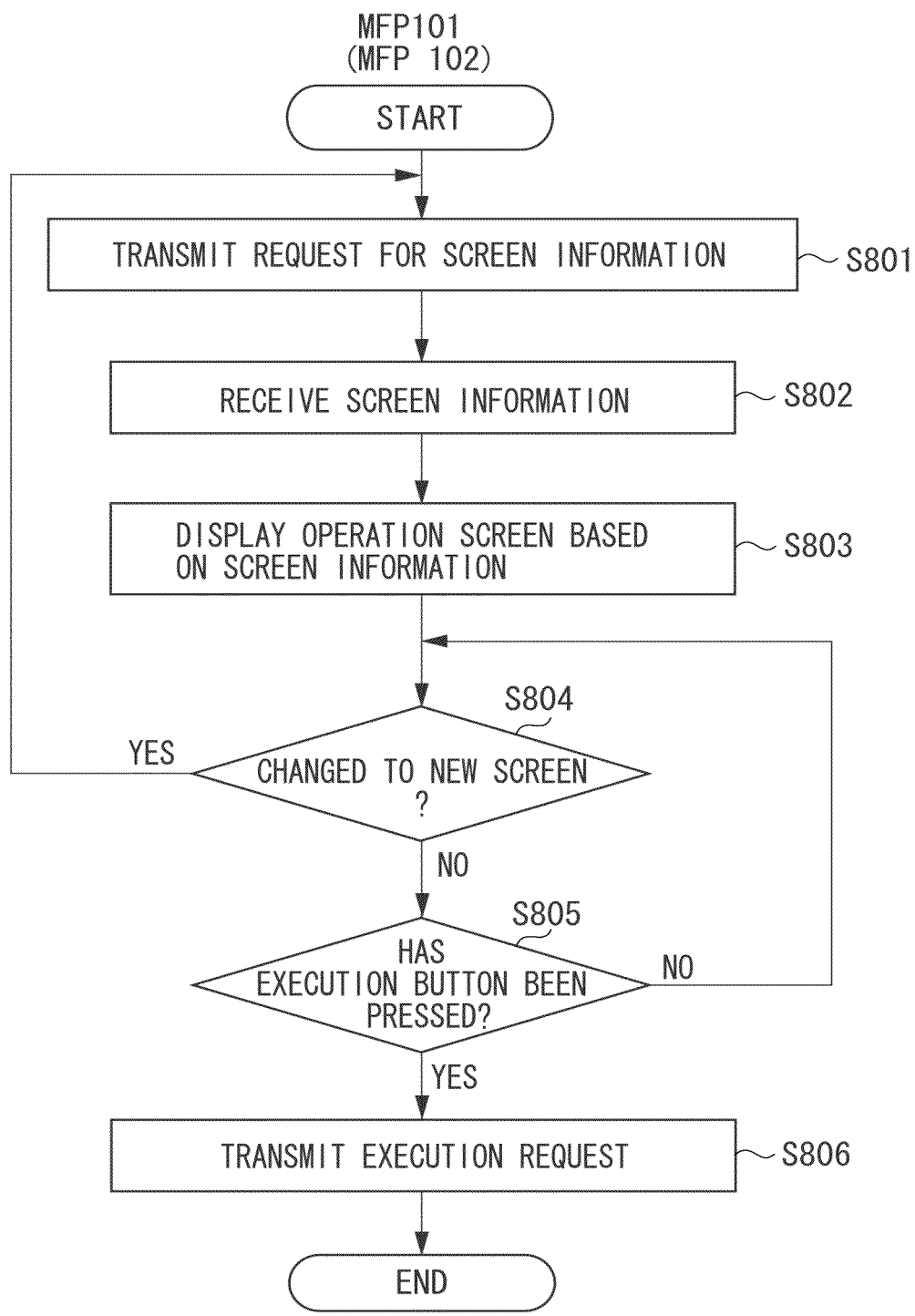

910: MENU SCREEN

920 COPY SCREEN

930 SCAN TO FAX SCREEN

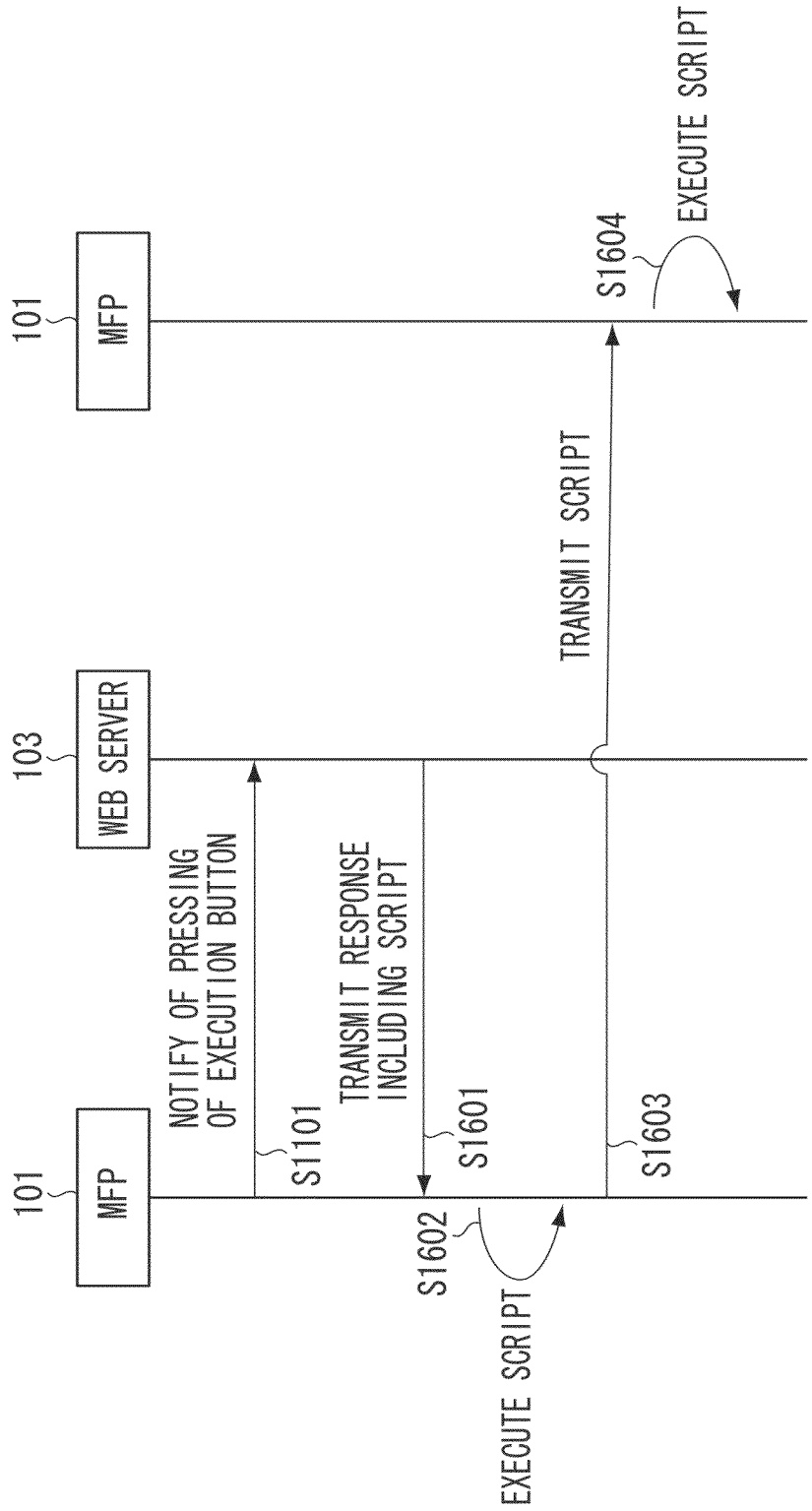

IMAGE PROCESSING APPARATUS, SERVER APPARATUS, METHODS FOR CONTROLLING DISPLAYS OF THE APPARATUSES, AND STORAGE MEDIUM

BACKGROUND OF THE INVENTION

1. Field of the Invention

The present invention relates to an image processing apparatus, a server apparatus, methods for controlling the apparatuses, and a storage medium.

2. Description of the Related Art

Conventionally, there has generally been known a Multi Function peripheral (MFP) that houses functions of apparatuses such as a scanner, a printer, a facsimile, and a network transmission apparatus in one case. A web browser is generally used for an operation unit of such an image processing apparatus. As a form for using various functions on an operation screen displayed by the web browser, a method discussed in Japanese Patent Application Laid Open No. 2008-003833 is known.

According to the method discussed in Japanese Patent Application Laid Open No. 2008-003833, the web browser first displays an operation screen regarding an image processing function on an operation unit based on screen information received from an external apparatus on a network. Having received a user's operation by using the operation screen, the web browser once transmits contents of the user's operation to the external apparatus. The web browser receives an execution instruction (script) of an image processing function from the external apparatus as a response to the transmitted operation contents. The web browser generates a Simple Object Access Protocol (SOAP) message to call up web services provided from the image processing apparatus based on the received execution instruction, and transmits the generated SOAP message to a web service provider to execute the image processing function of the image processing apparatus.

There is an image processing apparatus that controls whether to execute the image processing function based on a state of the web browser when the image processing function indicated by the execution instruction received from the external apparatus is executed. Specifically, it may be presumed that the user has canceled the execution of the image processing function, for example, when the web browser is not displayed, if an instruction to execute the image processing function is received from the external apparatus, and an image processing apparatus cancels execution of the image processing function.

In the image processing apparatus that performs control depending on whether to execute the image processing function based on the state of the web browser, execution of the image processing function indicated by the execution instruction received from the external apparatus, the web browser has to be displayed. To execute the image processing function, therefore, the user must display the web browser, which leads to lack of convenience.

SUMMARY OF THE INVENTION

The present invention is directed to improvement of convenience for a user by allowing a user not to display a web browser when an image processing apparatus executes an image processing function indicated by an execution instruction received from an external apparatus.

According to an aspect of the present invention, an image processing apparatus having an image processing function includes a web browser configured to display an operation screen provided from an external apparatus, a notification unit configured to notify the external apparatus of an instruction content input from a user via the operation screen, a reception unit configured to receive, from the external apparatus, one of a first execution instruction indicating the image processing function to be executed based on the instruction content notified from the notification unit and a second execution instruction indicating the image processing function, different from the first execution instruction, and a control unit configured to perform control to determine whether to execute the image processing function indicated by the first execution instruction based on a state of the web browser when the reception unit receives the first execution instruction, and execute an image processing function indicated by the second execution instruction irrespective of the state of the web browser when the reception unit receives the second execution instruction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a block diagram illustrating a configuration of a web server according to the first exemplary embodiment.

FIG. 6 illustrates a remote management list according to the first exemplary embodiment.

FIG. 7 is a flowchart illustrating a processing procedure of the MFP according to the first exemplary embodiment.

FIG. 8 is a flowchart illustrating a processing procedure of the MFP according to the first exemplary embodiment.

FIG. 16 illustrates a processing sequence executed between an MFP and a web server according to the third exemplary embodiment.

DESCRIPTION OF THE EMBODIMENTS

Various exemplary embodiments, features, and aspects of the invention will be described in detail below with reference to the drawings.

Figure 1:
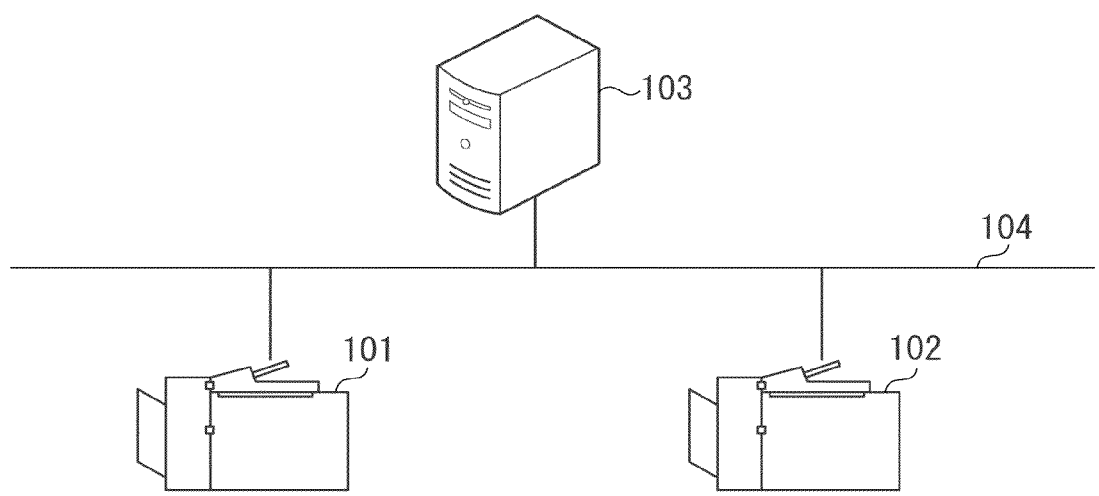
FIG. 1 illustrates an entire image processing system according to a first exemplary embodiment.

FIG. 1 illustrates an entire image processing system according to a first exemplary embodiment.

An MFP 101, a MFP 102, and a web server 103 are connected to a Local Area Network (LAN) 104 to communicate with one another. A connection form among the MFP 101, the MFP 102, and the web server 13 is not limited to the LAN. This system can be achieved by the Internet, wireless communication, and any other connection methods. As an example of an image processing apparatus, the MFP is described. However, the image processing apparatus of the present invention is not limited to the MFP. A Single Function Peripheral (SFP) such as a scanner or a printer can be used. As an example of an external apparatus, the web server is described. However, the external apparatus of the present invention is not limited to the web server. Other apparatus such as a MFP or a Personal Computer (PC) that has a web server function can be used.

In the present exemplary embodiment, for example, according to a user's operation at the MFP 101, the web server 103 generates an execution instruction to execute an image processing function of the MFP 101 or the MFP 102, and transmits the execution instruction to the MFP 101 or the MFP 102. The MFP 101 or the MFP 102 that has received the execution instruction executes the image processing function based on the execution instruction. In other words, the user of the MFP 101 can utilize image processing functions of both of the MFP 101 and the MFP 102.

In the present exemplary embodiment, a usage form in which an execution instruction received by a certain image processing apparatus is an execution instruction generated by a user's operation at the image processing apparatus is referred to as a local use. A usage form in which an execution instruction received by a certain image processing apparatus is an execution instruction generated by a user's operation at an image processing apparatus different from such an image processing apparatus is referred to as a remote use.

Figure 2A:
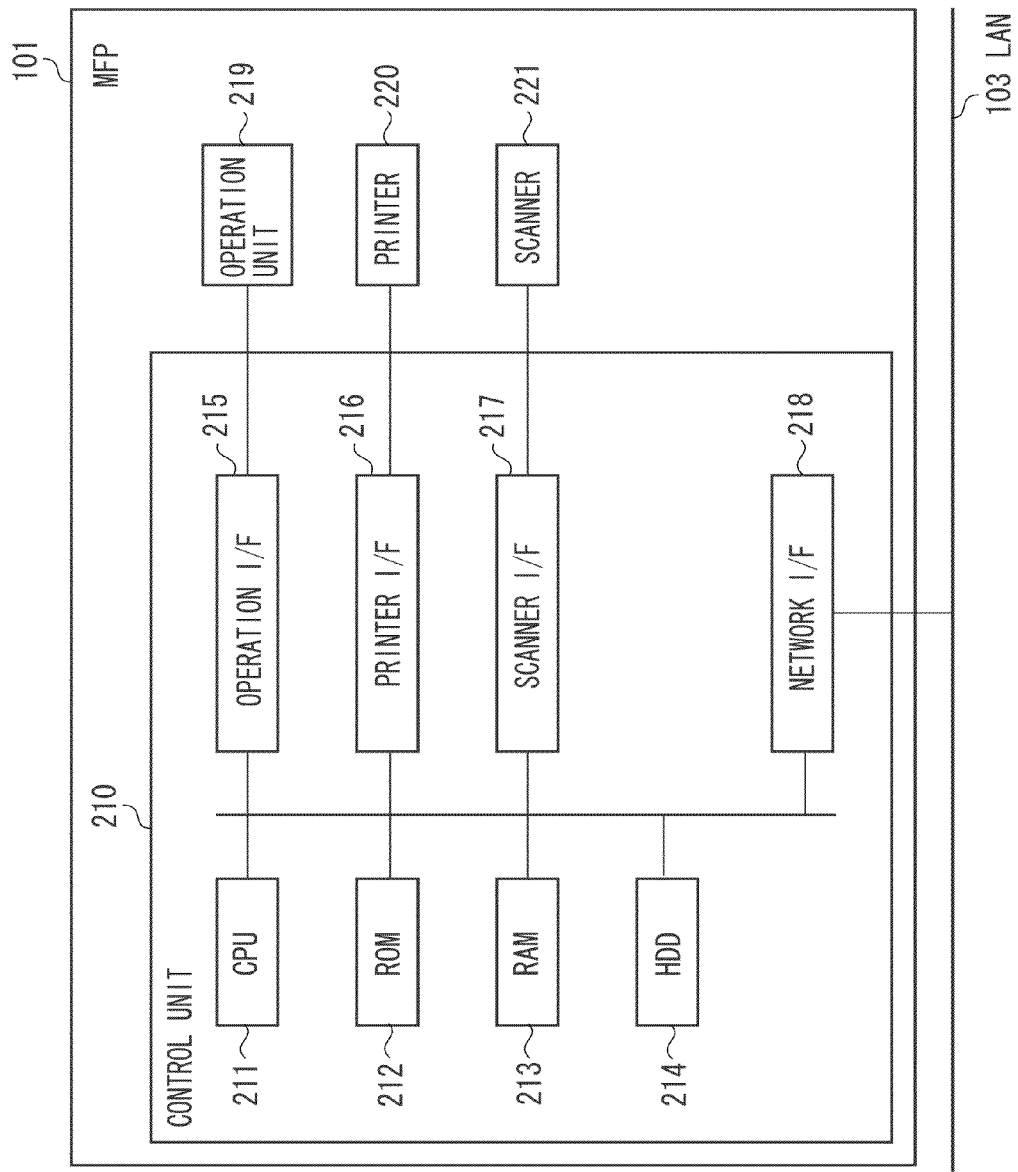
FIGS. 2A and 2B are block diagrams each illustrating a MFP configuration according to the first exemplary embodiment.
Figure 2B:
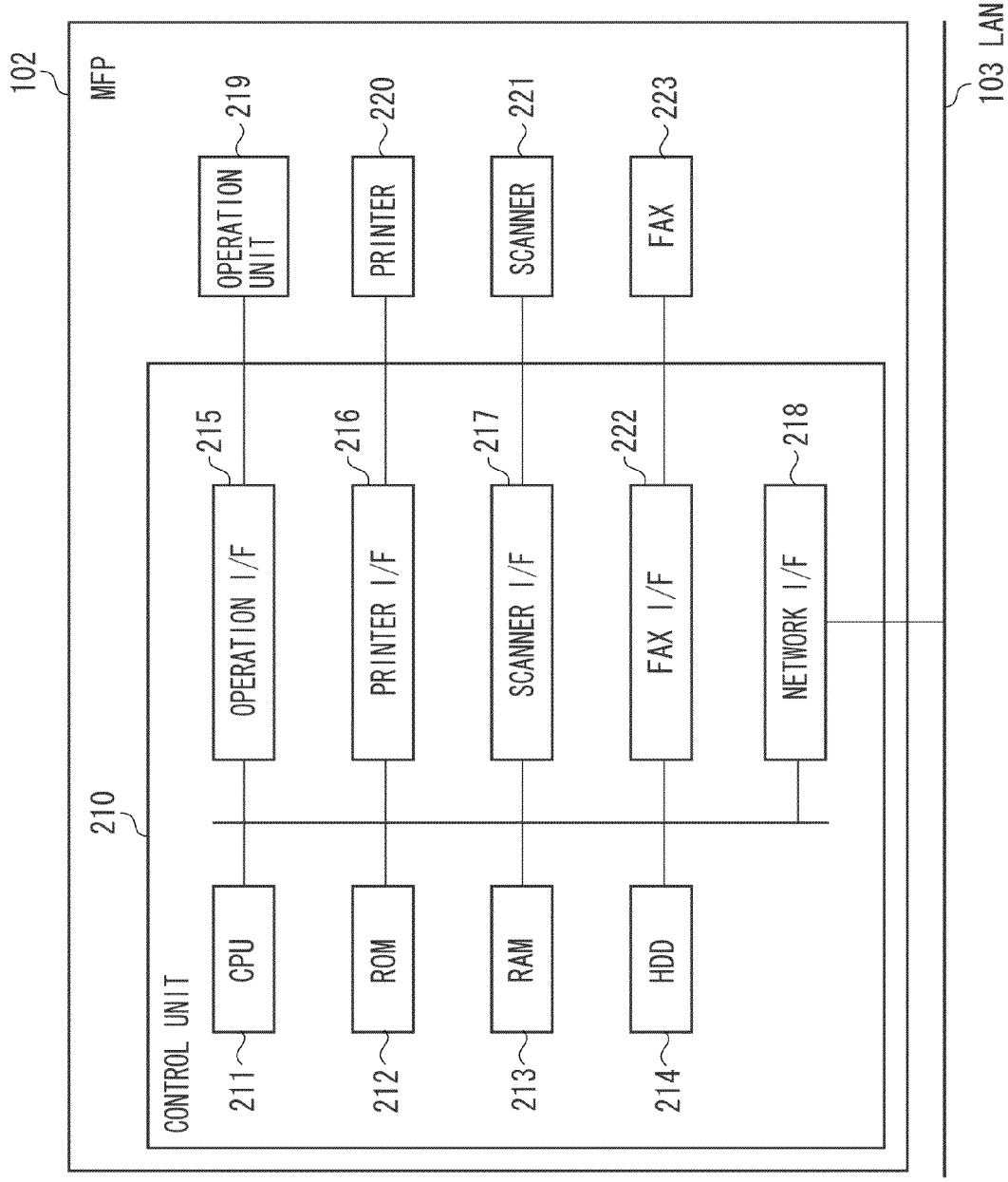

FIGS. 2A and 2B are block diagrams illustrating hardware configurations of the MFP 101 and the MFP 102. First, the hardware configuration of the MFP 101 illustrated in FIG. 2A is described.

A control unit 210 including a CPU 211 controls the MFP 101 overall. The CPU 211 reads a control program stored in a Read-Only Memory (ROM) 212 or a Hard Disk Drive (HDD) 214 to control the entire apparatus. The ROM 212 stores information such as a control program to execute processing of each flowchart described below. A Random Access Memory (RAM) 213 is used as a temporary storage area such as a main memory or a work area of the CPU 211. The HDD 214 stores, as in the case of the ROM 212, information such as a control program to execute processing of each flowchart described below.

An operation unit interface (I/F) 215 connects an operation unit 219 to the control unit 210. The operation unit I/F 215 outputs screen information to be displayed on the operation unit 219 to the operation unit 219, and transmits information input from the operation unit 219 by the user to the CPU 211. The operation unit 219 includes a display unit (liquid crystal display unit having a touch panel function) and a keyboard.

The MFP 101 has a web browser function. A web browser of the MFP 101 analyzes Hyper Text Markup Language (HTML) data received from the web server 103, and can display an operation screen based on description of the received HTML data on the liquid crystal display unit of the operation unit 219.

A printer I/F 216 connects a printer 220 to the control unit 210. Image data to be printed by the printer 220 is transferred from the control unit 210 to the printer 220 via the printer I/F 216. The printer 220 executes printing on a recording medium such as paper.

A scanner I/F 217 connects a scanner 221 to the control unit 210. The scanner 221 reads a document to generate image data, and executes reading to input the read image data to the control unit 210 via the scanner I/F 217.

A network I/F 218 connects the control unit 210 (MFP 101) to the LAN 104. The network I/F 218 transmits various pieces of information such as image data to an external apparatus (e.g., web server 103) on the LAN 104, or receives various pieces of information from the external apparatus on the LAN 104.

Next, the hardware configuration of the MFP 102 illustrated in FIG. 2B is described. Components denoted by reference numerals similar to those of the MFP 101 illustrated in FIG. 2A are similar to the components of the MFP 101, and thus description thereof is omitted.

A facsimile (FAX) I/F 222 connects a FAX 223 to a control unit 210. The FAX 223 executes FAX transmission to transmit image data generated by reading a document via a scanner 221. The MFP 102 is characterized by including a FAX function differently from the MFP 101.

FIG. 3 is a block diagram illustrating a hardware configuration of the web server 103. A control unit 210 including a CPU 311 controls the web server 103 overall. The CPU 311 reads a control program stored in a ROM 312 or a HDD 314 to execute various control processes. The ROM 312 stores a control program to execute processing of each flowchart described below, or information on a management list 600 described below referring to FIG. 6. A RAM 313 is used as a temporary storage area such as a main memory or a work area of the CPU 311. The HDD 314 stores, as in the case of the ROM 312, a control program to execute processing of each flowchart described below, or information on the management list 600 described below referring to FIG. 6.

A network I/F 315 connects the control unit 310 to the LAN 104. The network I/F 315 transfers various pieces of information to and from other apparatuses (e.g., MFP 101 or MFP 102) on the LAN 104.

Figure 4:
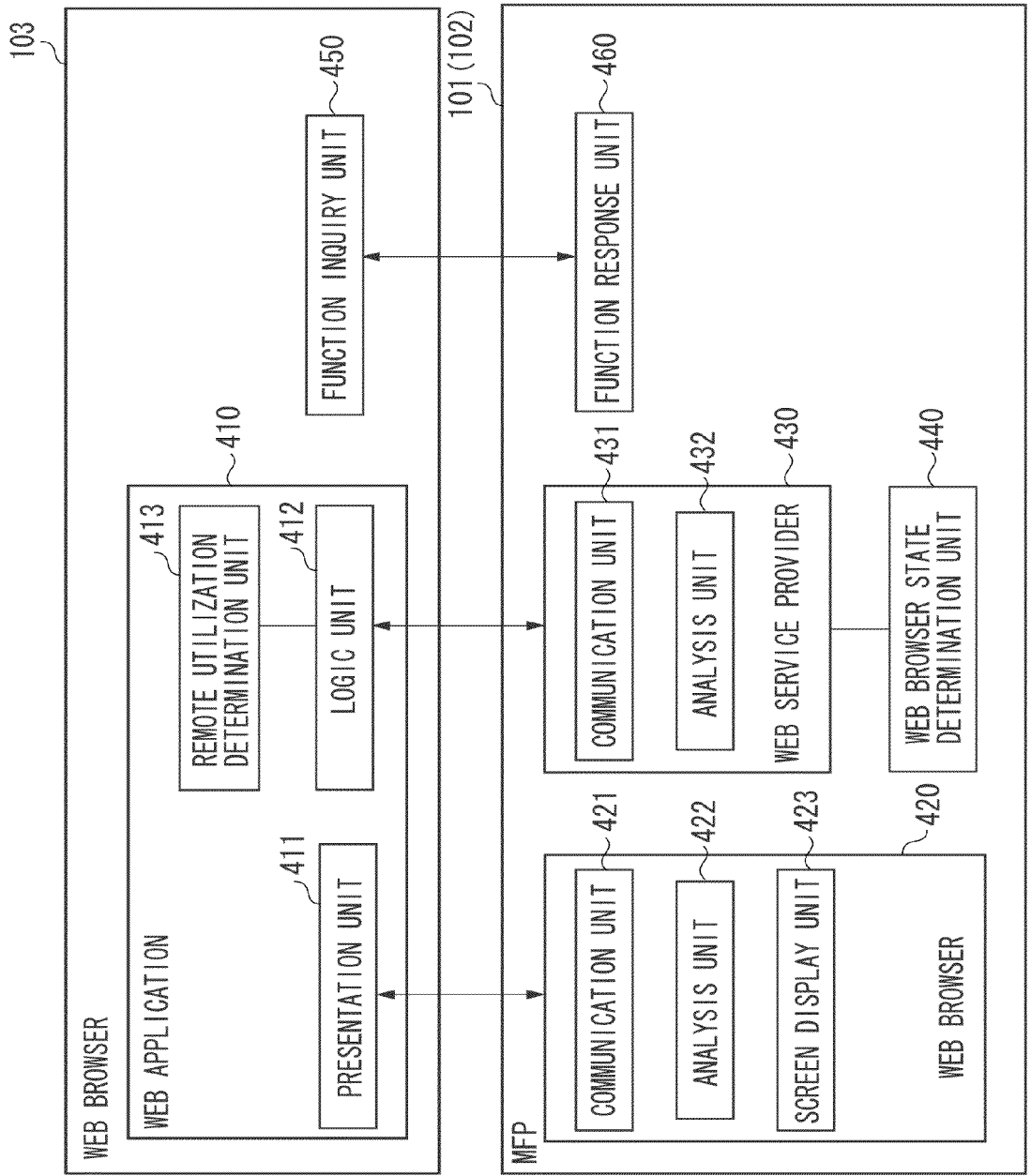
FIG. 4 is a block diagram illustrating a software configuration of the entire image processing system according to the first exemplary embodiment.

FIG. 4 illustrates a software configuration of the entire image processing system. Software functions illustrated in FIG. 4 are achieved by executing the control program with the CPU included in each of the MFP 101, the MFP 102, and the web server 103 illustrated in FIGS. 2A and 2B and FIG. 3.

The MFP 101 includes a web browser 420, a web service provider 430, a web browser state determination unit 440, and a function response unit 460. The MFP 102 has the same software configuration as that of the MFP 101, and thus description thereof is omitted.

The web browser 420 includes a communication unit 421, an analysis unit 422, and a screen display unit 423. The communication unit 421 communicates with a presentation unit 411 of the web browser 420 via the network I/F 218 according to a Hyper Text Transfer Protocol (HTTP). More specifically, the communication unit 421 requests screen information (e.g., HTML data) to display a screen by the web browser 420, to a web application 410, and receives the screen information transmitted from the presentation unit 411. The communication unit 421 notifies the web application 410 of an instruction content input from the user via the operation screen.

The analysis unit 422 analyzes the screen information received from the web application 410. The screen display unit 423 displays the operation screen on the operation unit 210 based on an analyzing result of the analysis unit 422.

The web service provider 430 includes a communication unit 431 and an analysis unit 432. The web service provider 430 provides web services to the web application 410 by using specific hardware resources (e.g., printer 220 or scanner 221) of the MFP 101.

The communication unit 431 receives, according to the HTTP, an execution instruction to execute an image processing function of the MFP 101 from the web application 410 via the network I/F 218.

The analysis unit 432 analyzes the execution instruction of the image processing function received by the communication unit 431 to determine whether the execution instruction is a remote use or a local use.

When the execution instruction is the local use, the web browser state determination unit 440 determines whether to execute an image processing function indicated by the execution instruction based on a state of the web browser 420. When the web browser state determination unit 440 determines that the image processing function indicated by the execution instruction is executed, the analysis unit 432 causes a processing execution application (not illustrated) to execute the image processing function. When the web browser state determination unit 440 determines that the image processing function indicated by the execution instruction is not executed, the analysis unit 432 determines that an execution request of the image processing function made by the web browser 420 has been canceled. Then, the analysis unit 432 finishes the processing without executing the image processing function by the processing execution application (not illustrated).

Next, processing when the execution instruction is a remote use is described. In the case of the remote use, the user may not be present at the image processing apparatus that has received the execution instruction, and the web browser 420 may not be displayed, or activated. This creates a possibility that when the web browser state determination unit 440 executes the determination, the image processing function indicated by the execution instruction may not be executed. According to the present exemplary embodiment, in view of this problem, when the execution instruction is a remote use, without making any determination by the web browser state determination unit 440, the analysis unit 432 causes the processing execution application (not illustrated) to execute the image processing function indicated by the execution instruction. As a result, convenience can be improved for the user.

The web browser state determination unit 440 determines whether to execute the image processing function indicated by the execution instruction received by the web service provider 430 based on the state of the web browser 420. Examples of determinations made by the web browser state determination unit 440 are described.

(1) Whether the Web Browser 420 is Displayed on the Foreground of the Operation Unit 219

When the web browser 420 is displayed on the foreground of the operation unit 219, the web browser state determination unit 440 determines that the image processing function indicated by the execution instruction received by the web service provider 420 is executed. When the web browser 420 is not displayed on the foreground of the operation unit 219, the web browser state determination unit 440 determines that the user operates another processing, in other words, the user has canceled execution of the image processing function.

(2) Whether the Web Browser 420 is Displayed on the Operation Unit 219

The case (1) is an example where a multiwindow function of displaying a plurality of operation screens in a stacked manner is provided. In the case of a configuration that includes no multiwindow function (when a certain operation screen is displayed, an operation screen displayed thus far is closed), the following determination is made. When the web browser 420 is displayed on the operation unit 219, the web browser state determination unit 440 determines that the image processing function indicated by the execution instruction received by the web service provider 420 is executed. When the web browser 420 is not displayed on the operation unit 219, the web browser state determination unit 440 determines that the user is going to operate another processing, in other words, the user has canceled execution of the image processing function.

(3) Whether the Web Browser has been Activated

When the web browser 420 has been activated, the web browser state determination unit 440 determines that the image processing function indicated by the execution instruction received by the web service provider 420 is executed. When the web browser 420 has not been activated, the web browser state determination unit 440 determines that the user is going to operate another processing, in other words, the user has canceled execution of the image processing function.

The determinations (1) to (3) are made to prevent execution of an unnecessary image processing function considering that the user has canceled the execution of the image processing function when it is presumed that the user who has requested the execution of the image processing function is operating another processing. The determinations (1) to (3) are only examples. Thus, other determination methods can be employed as long as they can determine that the user has cancelled the execution of the image processing function. An example of the other determination methods is comparing identification information (e.g., user ID) of a user who logs into the web browser 420 with that of a user added to the execution instruction, and executing the image processing function when the information matches with each other.

Returning to the description of the software configuration, the function response unit 460 receives an inquiry about a remotely usable image processing function from the web server 103 via the network I/F 218. The function response unit 460 transmits, as a response to the inquiry, a remotely usable image processing function of the MFP 101 to the web server 103 via the network I/F 218. This processing is described below referring to a flowchart of FIG. 7.

Next, a software configuration of the web server 103 is described. The web server 103 includes a web application 410 and a function inquiry unit 450. The web application 410 further includes a presentation unit 411, a logic unit 412, and a remote use determination unit 413.

The presentation unit 411 communicates with the communication unit 421 of the web browser 420 via the network I/F 315. Specifically, the presentation unit 411 generates screen information of an operation screen displayed on the web browser 420 in response to a request from the web browser 420, and transmits the screen information to the web browser 420 via the network I/F 315. Alternatively, after an execution request of the image processing function of the MFP 101 or the MFP 102 made on the operation screen is received, the presentation unit 411 transmits the execution request to the logic unit 412.

The logic unit 412 receives the execution request of the image processing function of the MFP 101 or the MFP 102 from the presentation unit 411. When the logic unit 412 has received the execution request of the image processing function, the remote use determination unit 413 determines whether the execution request is a local use or a remote use. Based on a determination result of the remote use determination unit 413 and the received execution request, the logic unit 412 generates an execution instruction to cause the MFP 101 or the MFP 102 to execute the image processing function. The logic unit 412 transmits the execution instruction to the web service provider 430 of the MFP 101 or the MFP 102 via the network I/F 315. The transmitted execution instruction contains information that enables the web service provider 430 to determine whether the execution request is a remote use or a local use.

The remote use determination unit 413 determines whether the execution request of the image processing function of the MFP 101 or the MFP 102 received by the logic unit 412 is a remote use. Specifically, the remote use determination unit 413 determines a local use when an image processing apparatus that has made the execution request matches an image processing apparatus to which the logic unit 412 transmits the execution instruction. On the other hand, the remote use determination unit 413 determines a remote use when the image processing apparatus that has made the execution request does not match the image processing apparatus to which the logic unit 412 transmits the execution instruction. The determination method is only an example, and hence the present invention is not limited to this method.

The function inquiry unit 450 makes an inquiry, to the MFP 101 or the MFP 102, about a remotely usable image processing function of the MFP. This inquiry is transmitted to the MFP 101 or the MFP 102 via the network I/F 315. The function inquiry unit 450 receives a response to the inquiry from the MFP 101 or the MFP 102 via the network I/F 315. The function inquiry unit 450 that has received the response stores the remotely usable image processing function of the MFP 101 or the MFP 102 in the management list 600 described below referring to FIG. 6. This processing is described below referring to a flowchart of FIG. 5.

According to the present exemplary embodiment, the web server 103 can provide the operation screen to the MFP 101 and the MFP 102. The operation screen contains a menu screen to display a list of image processing functions usable by the MFP 101 and the MFP 102. In the present exemplary embodiment, remotely usable image processing functions are displayed on the menu screen, as its feature.

Figure 5:
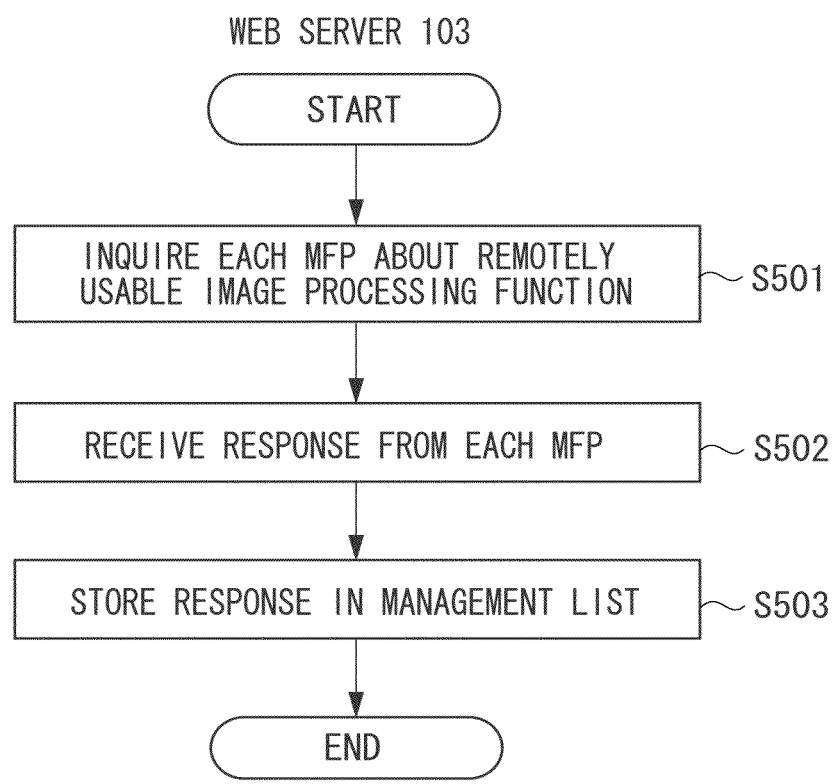
FIG. 5 is a flowchart illustrating a processing procedure of the web server according to the first exemplary embodiment.

The flowchart of FIG. 5 illustrates processing executed when the web server 103 makes an inquiry, to each MFP, about a remotely usable image processing function of the MFP. Steps S501 to S503 are carried out by the CPU 311 rasterizing and executing a program stored in a memory such as the ROM 312, in the RAM 313.

In step S501, the function inquiry unit 450 makes an inquiry, to each MFP, about the remotely usable image processing function of the MFP. In the present exemplary embodiment, the function inquiry unit 450 makes inquiries to the MFP 101 and the MFP 102. The inquiries can be made according to an instruction from the MFP 101 or a PC (not illustrated) based on a user's operation, or the web server 103 periodically makes inquiries at every predetermined time interval.

In step S502, the function inquiry unit 450 receives a response to the inquiry made in step S501 from each MFP. In step S502, the processing can stand by without proceeding to step S503 until responses are received from all the MFPs, or proceed to step S503 after predetermined time elapses.

In step S503, the function inquiry unit 450 stores the response received in step S503 in the management list 600 described below referring to FIG. 6.

FIG. 6 illustrates the management list 600 stored in the ROM 312 or the HDD 314 of the web server 103 according to the present exemplary embodiment. The management list 600 manages the response received in step S502 from each MFP.

It can be understood from the management list 600 that the MFP 101 has Print as a remotely usable image processing function and the MFP 102 has Print and Fax as remotely usable image processing functions.

The flowchart of FIG. 7 illustrates processing executed when the MFP 101 receives an inquiry about a remotely usable image processing function from the web server 103. Steps S701 and S702 are carried out by the CPU 211 rasterizing and executing a program stored in a memory such as the ROM 212, in the RAM 213.

In step S701, the function response unit 460 receives the inquiry about the remotely usable image processing function from the web server 103.

In step S702, the function response unit 460 transmits a response to the inquiry received in step S701 to the web server 103. In this case, the function response unit 460 transmits a message indicating that the remotely usable image processing function is Print, to the web server 103.

The MFP 102 performs the same processing as the present flowchart, and thus description thereof is omitted.

A flowchart of FIG. 8 illustrates processing executed when the user performs an operation on the operation screen displayed by the web browser 420 in the operation unit 219 of the MFP 101. Steps S801 to S806 are carried out by the CPU 211 rasterizing and executing a program stored in a memory such as the ROM 212, in the RAM 213. The processing of the flowchart is also executed by the MFP 102. However, only the processing of the MFP 101 is described.

In step S801, when a screen is to be changed according to a user's operation, the web browser 420 transmits a request for screen information to display the operation screen, to the presentation unit 411 of the web server 103. In step S802, the web browser 420 receives the screen information from the presentation unit 411. In step S803, the web browser 420 displays the operation screen based on the received screen information. In the flowchart, the screen information contains HTML data to display a web page. However, the screen information is not limited to this.

Figure 9A:
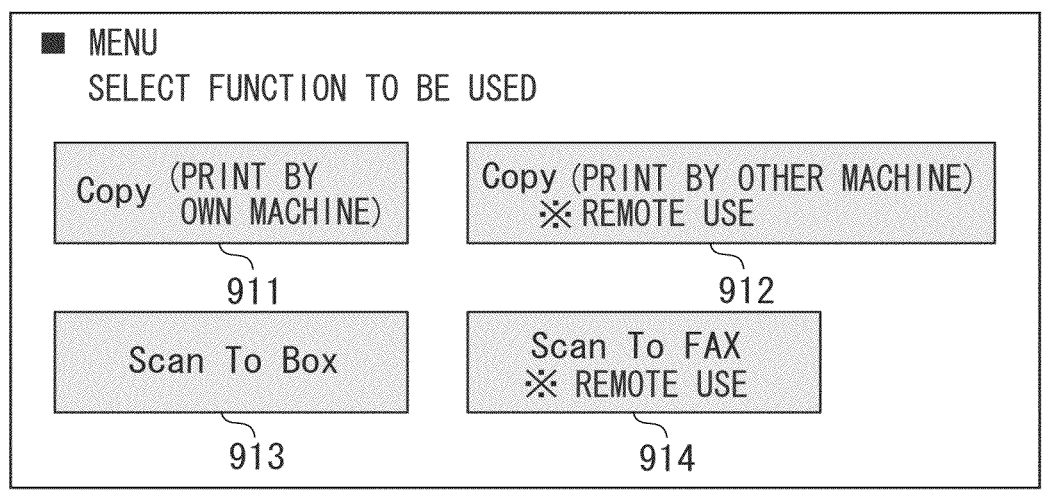
FIGS. 9A to 9C illustrate examples of error screens of the MFP according to the first exemplary embodiment.
Figure 9B:
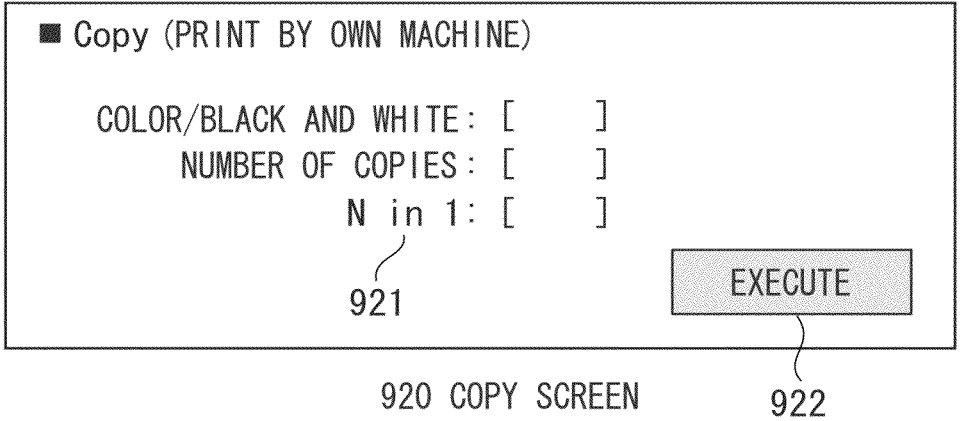
Figure 9C:
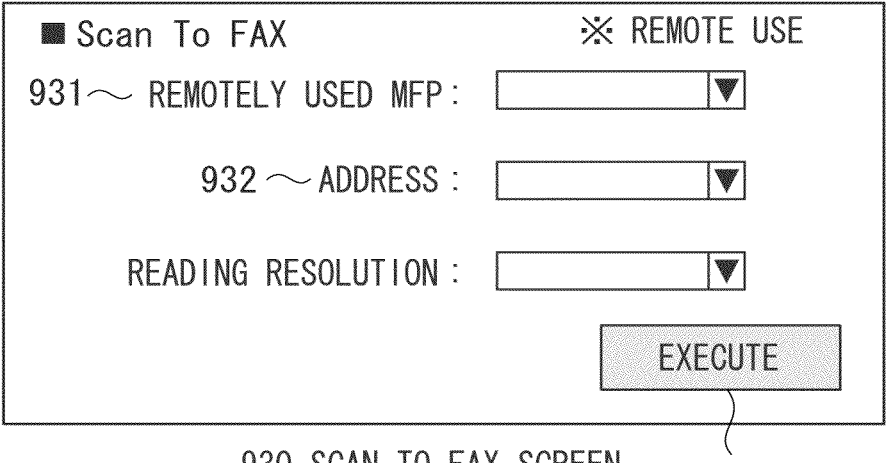

Each of FIGS. 9A to 9C illustrates an example of the operation screen displayed in step S803. The web browser 420 displays each of FIGS. 9A to 9C on the operation unit 210 based on the screen information received from the web server 103.

A menu screen 910 displays a list of image processing functions usable by the MFP 101. A Copy (print by own machine) button 911 is a button for executing copying in a case where a printer 220 of an own machine executes printing based on image data generated by reading a document via the scanner 221. A Copy (print by another machine) button 912 is a button for executing copying in a case where a printer 220 of another machine executes printing based on the image data generated by reading the document via the scanner 221. A Scan To Box button 913 is a button for executing box storage in a case where the image data generated by reading the document via the scanner 221 is stored in a HDD 214 (box) of the own machine. A Scan To FAX button 914 is a button for executing FAX transmission in a case where the image data generated by reading the document via the scanner 221 is transmitted by using a FAX function of another machine.

In the present exemplary embodiment, the Copy (print by another machine) 912 and the Scan To FAX button 914 are respectively for enabling the MFP 101 to use a Print function and a FAX function of another machine. Thus, to notify the user that the processing remotely uses an image processing function provided from another machine, "* remote use" is displayed. This display enables the user to understand that the processing of the displaying must remotely use the image processing function of another machine. A method of notifying the user that the processing remotely uses the image processing function of another machine is not limited to this. For example, various forms such as changing of a button color and notifying of pressing of a button to prompt the user to check can be employed.

A Copy screen 920 is an operation screen displayed when the user presses the Copy (print by own machine) button 911 on the menu screen 910. When the user inputs a copy setting value 921 and presses an execution button 922, the printer 220 of the MFP 101 executes printing based on the image data generated by reading the document via the scanner 221.

A Scan To FAX screen 930 is an operation screen displayed when the user presses the Scan To FAX button 914 on the menu screen 910. In the present exemplary embodiment, the Scan To FAX is processing that remotely uses the FAX function of another machine, and hence a MFP other than the MFP 101 which is remotely used by the user is selected by device selection 931. At this time, based on the management list 600, a MFP (e.g., MFP 102) having FAX as a remotely usable image processing function can be selected by the device selection 931. When the user inputs a FAX setting value 932 such as an address or a reading resolution of the document, sets the document in the scanner 221, and presses an execution button 933, FAX transmission is executed. More specifically, a FAX 223 of another MFP such as the MFP 102 transmits by FAX the image data generated by reading the document with the scanner 221 provided in MFP 101.

Referring back to the flowchart of FIG. 8, in step S804, the CPU 211 determines whether a user's operation has instructed a new screen change. When the CPU 211 determines that the new screen change has been instructed (YES in step S804), the processing returns to step S801. When the CPU 211 determines that no new screen change has been instructed (NO in step S804), the processing proceeds to step S805.

In step S805, the CPU 211 determines whether the execution button of the image processing function has been pressed on the operation screen such as the Copy screen 920 or the Scan To FAX screen 930. When the CPU 211 determines that the execution button has not been pressed (NO in step S805), the processing returns to step S804. When the CPU 211 determines that the execution button has been pressed (YES in step S805), the processing proceeds to step S806. In step S806, to notify the web server 103 that the execution button has been pressed, the communication unit 421 of the web browser 420 transmits an execution request of the image processing function based on the user's operation (pressing of execution button) to the web server 103.

Figure 10:
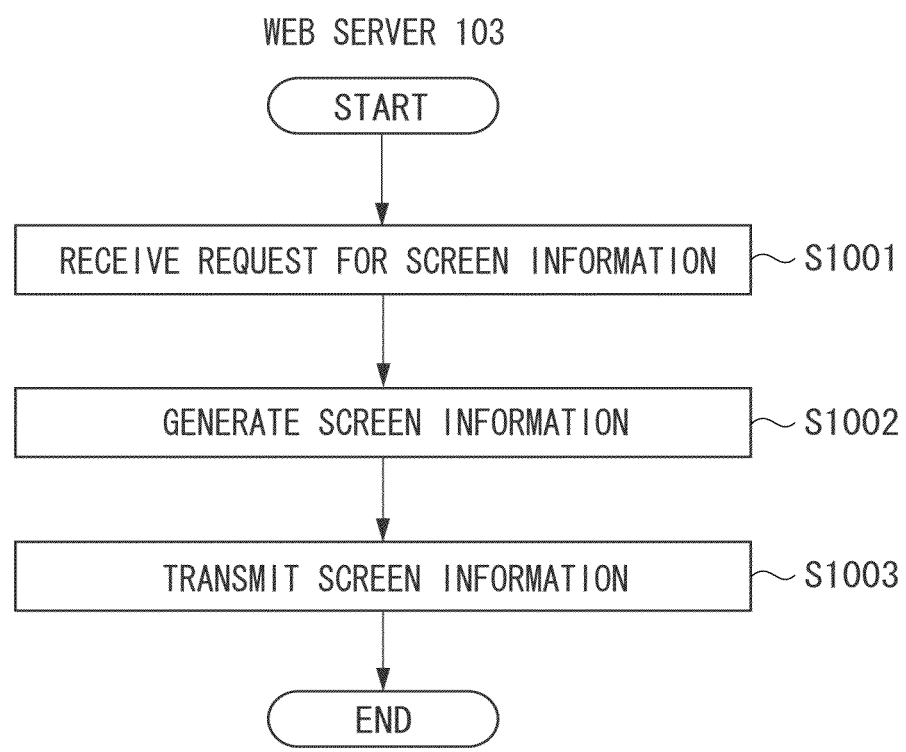
FIG. 10 is a flowchart illustrating a processing procedure of the web server according to the first exemplary embodiment.

Next, referring to a flowchart of FIG. 10, processing executed by the web server 103 that has received the screen information request transmitted by the MFP 101 in step S801 illustrated in FIG. 8 is described. Steps S1001 to S1003 are carried out by the CPU 311 rasterizing and executing a program stored in a memory such as the ROM 312, in the RAM 313.

In step S1001, the presentation unit 411 of the web application 410 receives the screen information request transmitted by the MFP 101.

In step S1002, the presentation unit 410 generates appropriate screen information to be transmitted to the MFP 101. In this case, when the MFP 101 requests the menu screen 910, the presentation unit 411 generates the screen information based on the management list 600. Specifically, when a MFP other than the MFP 101 (MFP 102 in the present exemplary embodiment) provides a remotely usable image processing function, the presentation unit 411 generates screen information containing a button for selecting such an image processing function. Thus, according to the present exemplary embodiment, the image processing function remotely usable by the MFP 101 can be displayed on the menu screen displayed by the MFP 101.

In step S1003, the presentation unit 411 transmits the screen information generated in step S1002 to the web browser 420.

Thus, the web server 103 can generate the appropriate screen information according to the screen information request from the MFP 101 and transmit it to the MFP 101. The remotely usable image processing function of each MFP is managed based on the management list 600, and hence the remotely usable image processing function can be provided to each MFP.

Figure 11:
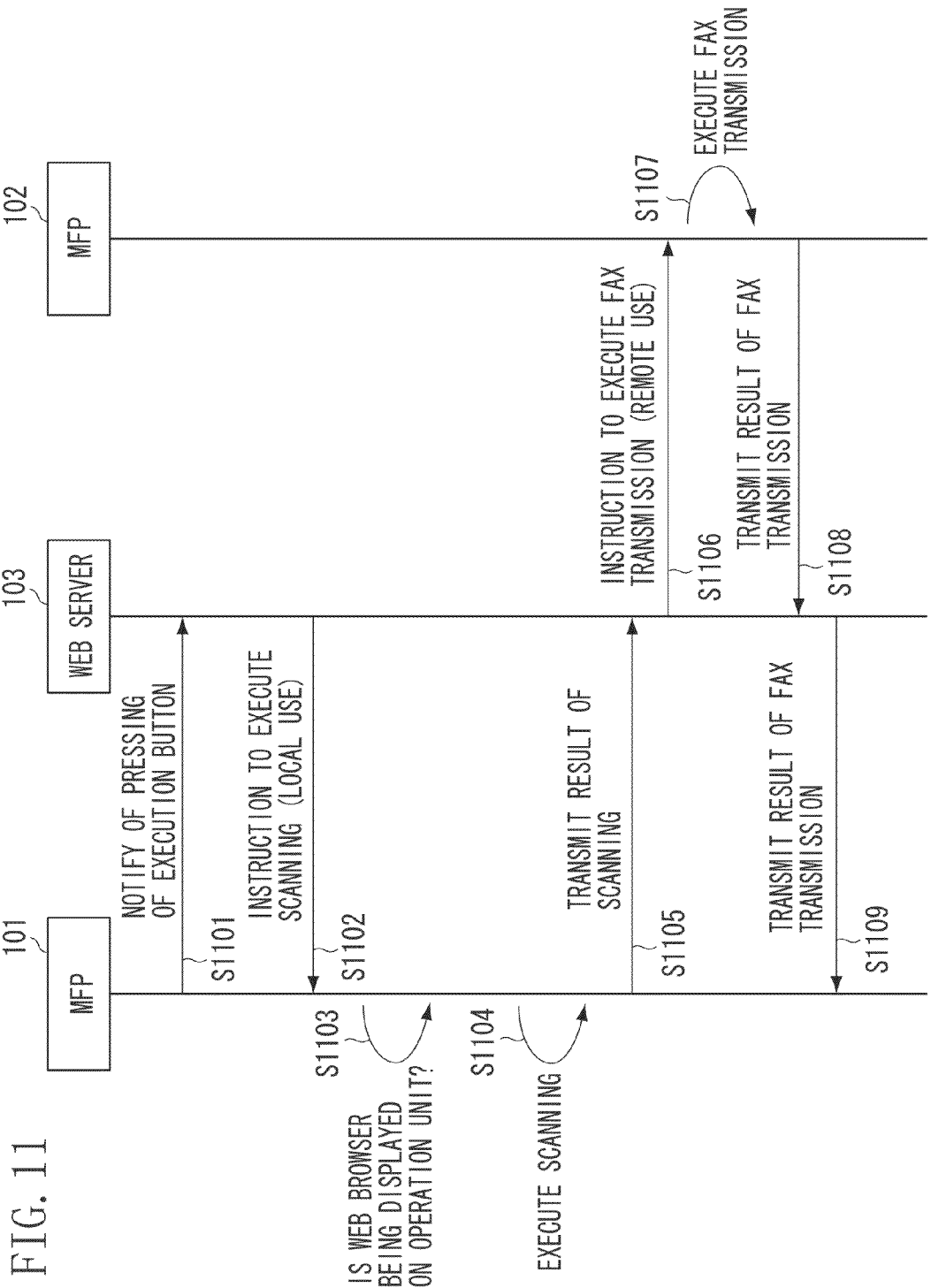
FIG. 11 illustrates a processing sequence executed between the MFP and the web server according to the first exemplary embodiment.

FIG. 11 is a sequential diagram illustrating processing when the MFP 101 displays the Scan To FAX screen 930, and the user selects the MFP 102 as a remotely used MFP, and presses the execution button 933 after setting the document in the scanner 221.

In step S1101, the web browser 420 of the MFP 101 notifies the presentation unit 411 of the web server 103 that the execution button 933 has been pressed.

In step S1102, the logic unit 412 of the web server 103 generates an execution instruction of the image processing function based on the notification received in step S1101. In the present exemplary embodiment, first, to acquire image data to be transmitted by FAX, an execution instruction of scanning is generated. The logic unit 412 transmits the generated execution instruction of scanning to the web service provider 430. In this case, the scanning is a local use for the MFP 101, and hence information indicating the local use is added to the execution instruction transmitted in step S1102.

The web service provider 430 determines whether the execution instruction is a local use or a remote use, in the MFP 101 that has received the execution instruction. In this case, the information indicating the local use has been added to the received execution instruction, and hence the web service provider 430 determines that the instruction is the local use. When the received execution instruction is the local use, in step S1103, the web browser state determination unit 440 determines whether to execute an image processing function indicated by the execution request based on a state of the web browser 420. In the present exemplary embodiment, among the examples of determination methods, when the web browser 420 is displayed on the operation unit 219, the web browser 420 determines that the image processing function indicated by the execution instruction is executed. When the web browser 420 is displayed on the operation unit 219, in step S1104, the web service provider 430 executes the image processing function indicated by the execution instruction, namely, scanning.

In step S1105, the web service provider 430 transmits information indicating completion of the scanning and image data acquired as a result of the scanning to the logic unit 412 of the web server 103.

In this sequential diagram, the web server 103 must transmit by FAX the image data acquired by the scanning in the MFP 101 from the MFP 102. Thus, in step S1106, the logic unit 412 generates an execution instruction to execute a FAX transmission function, and transmits the execution instruction to the web service provider 430 of the MFP 102. In this case, the FAX transmission is a remote use for the MFP 102, and hence information indicating the remote use is added to the execution instruction transmitted in step S1102. The logic unit 412 also transmits the image data transmitted by the FAX transmission to the web service provider 430 of the MFP 102.

In the MFP 102 that has received the execution instruction, the web service provider 430 determines whether the execution instruction is a local use or a remote use. In this case, the received execution information has the information indicating the remote use, and hence the web service provider 430 determines the remote use.

When the received execution instruction is a local use, the web browser state determination unit 440 must determine whether to execute an image processing function indicated by the execution instruction as in the case of step S1103 based on a state of the web browser 420. However, in the case of the remote use, the user is not present at the MFP 102, and thus nobody operates the MFP 102. The web browser may not be displayed on the operation unit 219. In such a case, when the determination is made similar to a case of the local use, the image processing function is not executed in the image processing apparatus that remotely uses the MFP considering that the user has canceled the execution of the image processing function. Thus, in the present exemplary embodiment, in the case of the remote use, the web browser state determination unit 440 does not determine whether to execute the image processing function indicated by the execution instruction based on the state of the web browser 420. As a result, in the case of the remote use, the image processing function indicated by the execution instruction is executed irrespective of the state of the web browser 420, and convenience is improved for the user.

In step S1107, the web service provider 430 of the MFP 102 executes FAX transmission indicated by the received execution instruction. In this case, the image data received in step S1106 is transmitted by FAX.

In step S1108, the web service provider 430 of the MFP 102 transmits information indicating completion of the FAX transmission to the logic unit 412 of the web server 103. In step S1109, the logic unit 412 of the web server 103 notifies the web service provider 430 of the MFP 101 of the information indicating that the FAX transmission is completed at the MFP 102. At this time, a screen indicating the completion of the FAX transmission at the MFP 102 that is a remotely used MFP is displayed on the operation unit 219 of the MFP 101.

Figure 12:
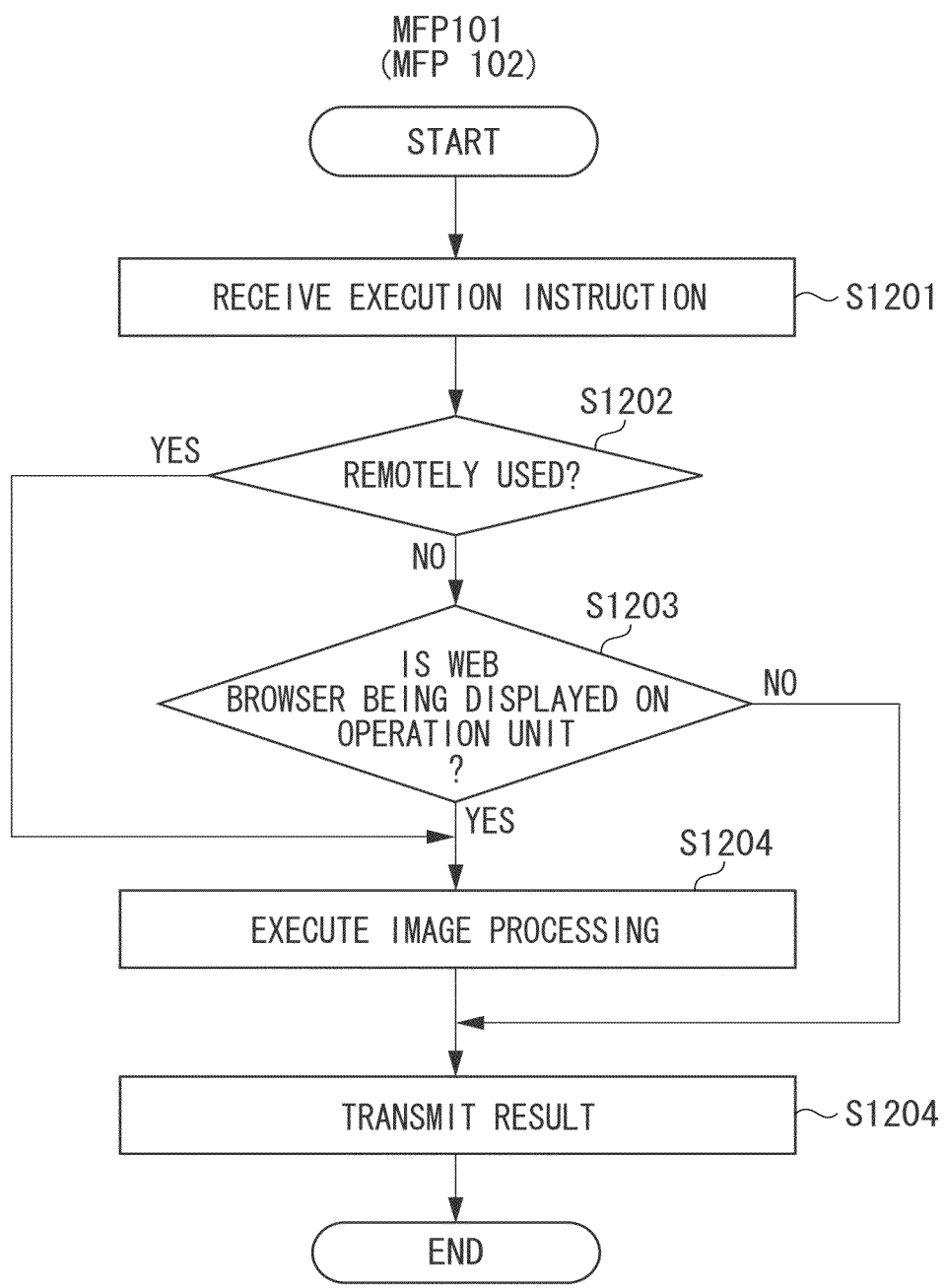
FIG. 12 is a flowchart illustrating a processing procedure of the MFP according to the first exemplary embodiment.

A flowchart of FIG. 12 illustrates processing executed by the MFP 101 that has received the execution instruction transmitted from the web server 103. Steps S1201 to S1205 are carried out by rasterizing and executing a program stored in a memory such as the ROM 212, in the RAM 213 by the CPU 211 provided in the MFP 101. The processing procedure of the flowchart is also executed by the MFP 102. However, only the processing procedure of the MFP 101 is described.

In step S1201, the communication unit 431 of the web service provider 430 receives an execution instruction of an image processing function from the web server 103.

In step S1202, the analysis unit 432 of the web service provider 430 determines whether the execution instruction received in step S1201 is a remote use. When the analysis unit 432 determines that the execution instruction received in step S1201 is not a remote use, in other words, it is a local use, (NO in step S1202), the processing proceeds to step S1203.

In step S1203, the web browser state determination unit 440 determines whether to execute an image processing function indicated by the execution instruction received in step S1201 based on a state of the web browser 420. In the present exemplary embodiment, when the web browser 420 is displayed on the operation unit 219, the web browser state determination unit 440 determines that the image processing function indicated by the execution instruction received in step S1201 is executed. When the web browser 420 is displayed on the operation unit 219, the processing proceeds to step S1204. When the web browser 420 is not displayed on the operation unit 219, the web browser state determination unit 440 determines that the user has canceled the execution of the image processing function. The web service provider 430 then cancels the execution of the image processing function. In step S1205, the web service provider 430 notifies the web server 103 that the execution of the image processing function has been cancelled.

When the analysis unit 432 determines that the received execution instruction is a remote use (YES in step S1202), the processing proceeds to step S1204 without executing determination of step S1203 by the web browser state determination unit 440.

In step S1204, the web service provider 430 executes the image processing function indicated by the execution instruction received in step S1201.

In step S1205, the web service provider 430 transmits the execution result of the image processing function to the logic unit 412 of the web server 103. At this time, the web service provider 430 also transmits information such as image data acquired by executing the image processing function to the logic unit 412 of the web server 103.

Figure 13:
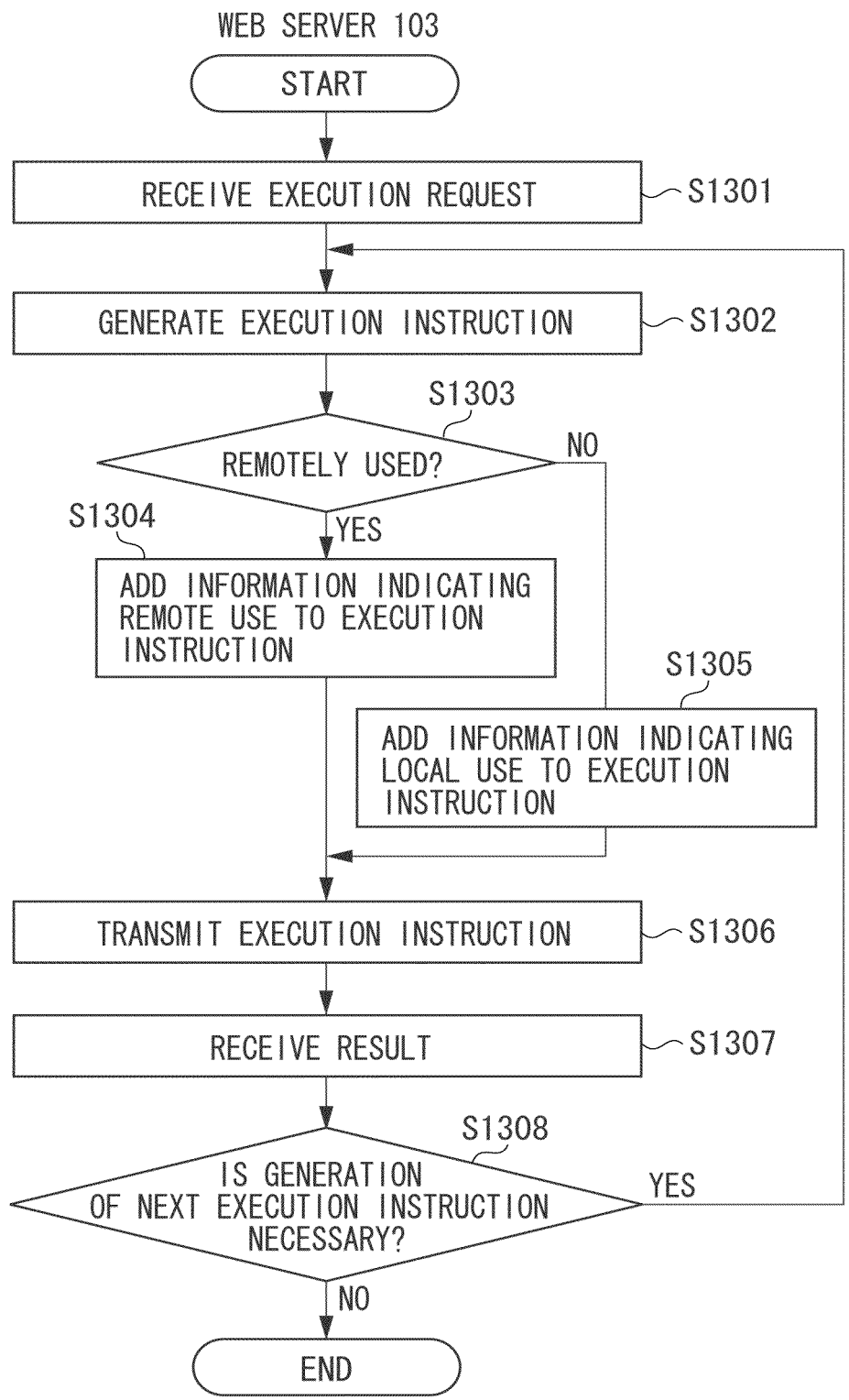
FIG. 13 is a flowchart illustrating a processing procedure of the web server according to the first exemplary embodiment.

A flowchart of FIG. 13 illustrates processing executed by the web server 103 that has received the execution request transmitted from the MFP 101 or the MFP 102 in step S806 illustrated in FIG. 8. Steps S1301 to S1307 are carried out by the CPU 311 rasterizing and executing a program stored in a memory such as the ROM 312, in the RAM 313 of the web server 103.

In step S1301, the presentation unit 411 receives the execution request transmitted in step S806 illustrated in FIG. 8.

In step S1302, the logic unit 412 generates an execution instruction corresponding to the execution request received in step S1301.

In step S1303, the remote use determination unit 413 determines whether the execution instruction generated in step S1302 is a remote use. In the present exemplary embodiment, for example, the remote use determination unit 413 determines that the instruction is a local use when an image processing apparatus that has made the execution request matches with an image processing apparatus to which the web server 103 transmits the execution instruction. On the other hand, the remote use determination unit 413 determines that the instruction is the remote use when the image processing apparatus that has made the execution request does not match with the image processing apparatus to which the web server 103 transmits the execution instruction. When the remote use determination unit 413 determines that the execution instruction is the remote use (YES in step S1303), the processing proceeds to step S1304, and the logic unit 412 adds information indicating the remote use to the execution instruction. When the remote use determination unit 413 determines that the execution instruction is not the remote use (NO in step S1303), namely, the local use, the processing proceeds to step S1305, and the logic unit 412 adds information indicating the local use to the execution instruction.

It is presumed here that the Scan To FAX screen 930 is displayed on the operation screen 219 of the MFP 101, and the user selects the MFP 102 as a remotely used MFP, and presses the execution button 933 after setting of a document in the scanner 221. FAX transmission remotely uses the FAX function of the MFP 102 that is another machine for the MFP 101, while scanning to acquire image data transmitted by FAX is a local use for the MFP 101. Thus, even if an execution request for a remotely used image processing function is made at the MFP 101, when an instruction to execute the image processing function executable at the MFP 101 (e.g., scanning to acquire image data) is generated, the execution instruction is determined to be the local use.

In step S1306, the logic unit 412 transmits the execution instruction to the web service provider 430 of the MFP 101 or the MFP 102. Whether the execution instruction is transmitted to the web service provider 403 of the MFP 101 or the MFP 102 is determined based on the execution request received in step S1301. As illustrated in the sequential diagram of FIG. 11, the logic unit 412 may transmit information such as image data used by the remotely used MFP together with the execution instruction.

In step S1307, the logic unit 412 receives the execution result of the image processing function from the MFP 101 or the MFP 102 to which the execution instruction has been transmitted. As information about the execution result of the image processing function, information indicating completion of the execution of the image processing function or information indicating cancellation of the execution of the image processing function is received. As illustrated in the sequential diagram of FIG. 11, the logic unit 412 may receive information such as image data used by the remotely used MFP as a result of image processing.

In step S1308, the logic unit 412 analyzes the result of the image processing received in step S1307 to determine whether generation of a next execution instruction is necessary. Generation of a next execution instruction is necessary, for example, in a case where a series of processes is carried out by using a plurality of MFPs, as described above referring to the sequential diagram of FIG. 11. Also in a case where a plurality of image processes is executed not by a plurality of MFPS but by a single MFP, a next execution instruction needs to be generated. When the logic unit 413 determines that generation of a next execution instruction is necessary (YES in step S1308), the processing returns to step S1302, and the logic unit 412 generates a next execution instruction. When the logic unit 412 determines that generation of a next execution instruction is not necessary (NO in step S1308), the processing of this flowchart is finished.

The processing executed by the web server 103 that has received the execution request transmitted from the MFP 101 or the MFP 102 in step S806 illustrated in FIG. 8 is not limited to the flowchart of FIG. 13. The following processing can be employed.

In step S1306, the logic unit 412 that has generated the execution instruction in step S1302 adds information indicating the MFP (in the present exemplary embodiment, the MFP 101 or the MFP 102) which has transmitted the execution request received in step S1301, and transmits the execution instruction. In step S1202 illustrated in FIG. 12, the MFP 101 or the MFP 102 that has received the execution instruction determines as no remote use, namely, as a local use, when the information indicating the MFP which has transmitted the execution request matches with an own machine. The MFP 101 or the MFP 102 that has received the execution instruction determines as a remote use when the information indicating the MFP which has transmitted the execution request does not match with the own machine.

As described above, according to the present exemplary embodiment, when the execution instruction is a remote use, the MFP 101 or the MFP 102 that has received the execution instruction from the web server 103 executes the image processing function indicated by the execution instruction irrespective of the state of the web browser 420. Thus, for example, even when the web browser is not displayed on the operation unit of the remotely used image professing apparatus, the image processing function is executed considering that the execution of the image processing function indicated by the execution instruction has not been canceled in the case of the remote use. For the user, in the case of the remote use, for example, there is no need to display the web browser 420. Thus, convenience is improved.

According to the first exemplary embodiment, in step S1105 illustrated in FIG. 11, the MFP 101 transmits the image data acquired by the scanning to the web server 103. In step S1106, the web server 103 transmits the image data to the MFP 102 that is a remotely used apparatus. The transmission of the image data causes an increase in network traffic. Hence, in the case of the method illustrated in the sequential diagram of FIG. 11, traffic increases between the MFP 101 and the web server 103 and between the MFP 102 and the web server 103. Therefore, a second exemplary embodiment is directed to prevention of traffic increases between a MFP 101 and a web server 103 and between a MFP 102 and a web server 103.

Figure 14:
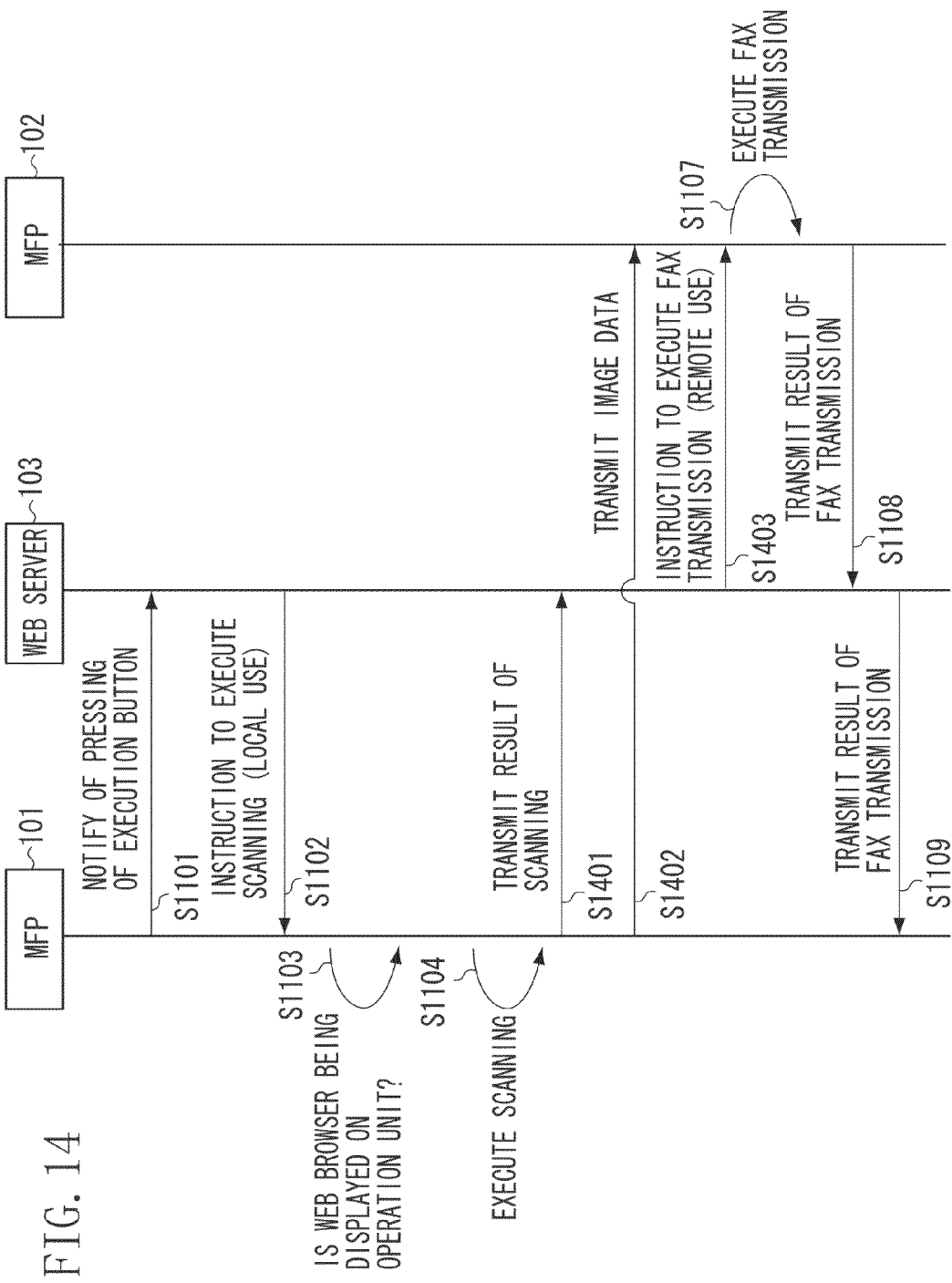
FIG. 14 illustrates a processing sequence executed between an MFP and a web server according to a second exemplary embodiment.

FIG. 14 is a sequential diagram illustrating processing executed, in the present exemplary embodiment, when a Scan To FAX screen 930 is displayed, and a user selects the MFP 102 as a remotely used MFP, and presses an execution button 933 after setting of a document in a scanner 221. Steps denoted by similar reference numerals illustrated in FIG. 11 indicate similar processing, and thus description thereof is omitted.

In step S1401, a web service provider 430 of the MFP 101 transmits information indicating completion of scanning to a logic unit 412 of the web server 103. In this case, in step S1401, the web service provider 430 of the MFP 102 also transmits information (e.g., file name) to identify image data acquired by the scanning, to the logic unit 412. Differently from the first exemplary embodiment, the image data acquired by the scanning is not transmitted to the logic unit 412 of the web server 103.

In step S1402, a network I/F 218 of the MFP 101 transmits the image data acquired by the scanning to the MFP 102 via a LAN 104. In this case, the image data is transmitted without the intervening web server 103.

In step S1403, the logic unit 412 of the web server 103 generates an execution instruction to execute a FAX transmission function, and transmits the execution instruction to the web service provider 430 of the MFP 102. In this case, the execution instruction contains the information to identify the image data transmitted in step S1401 and information to instruct the MFP 102 to execute FAX transmission by using the image data. Differently from the first exemplary embodiment, the web server 103 does not receive the image data transmitted in the FAX transmission, and hence the logic unit 412 of the web server 103 does not transmit the image data.

As described above, according to the present exemplary embodiment, no image data is transmitted between the MFP 101 and the web server 103 and between the MFP 102 and the web server 103. Thus, traffic increases can be prevented between the MFP 101 and the web server 103 and between the MFP 102 and the web server 103.

In the first and second exemplary embodiments, the web application 410 communicates with the web browser 420 and the web service provider 430 included in each of the MFP 101 and the MFP 102. However, the present exemplary embodiment has a feature that an execution instruction of an image processing function to be transmitted to a web service provider 430 included in each of a MFP 101 and a MFP 102 is embedded and transmitted in a response to a web browser 420 included in the MFP 101.

Figure 15:
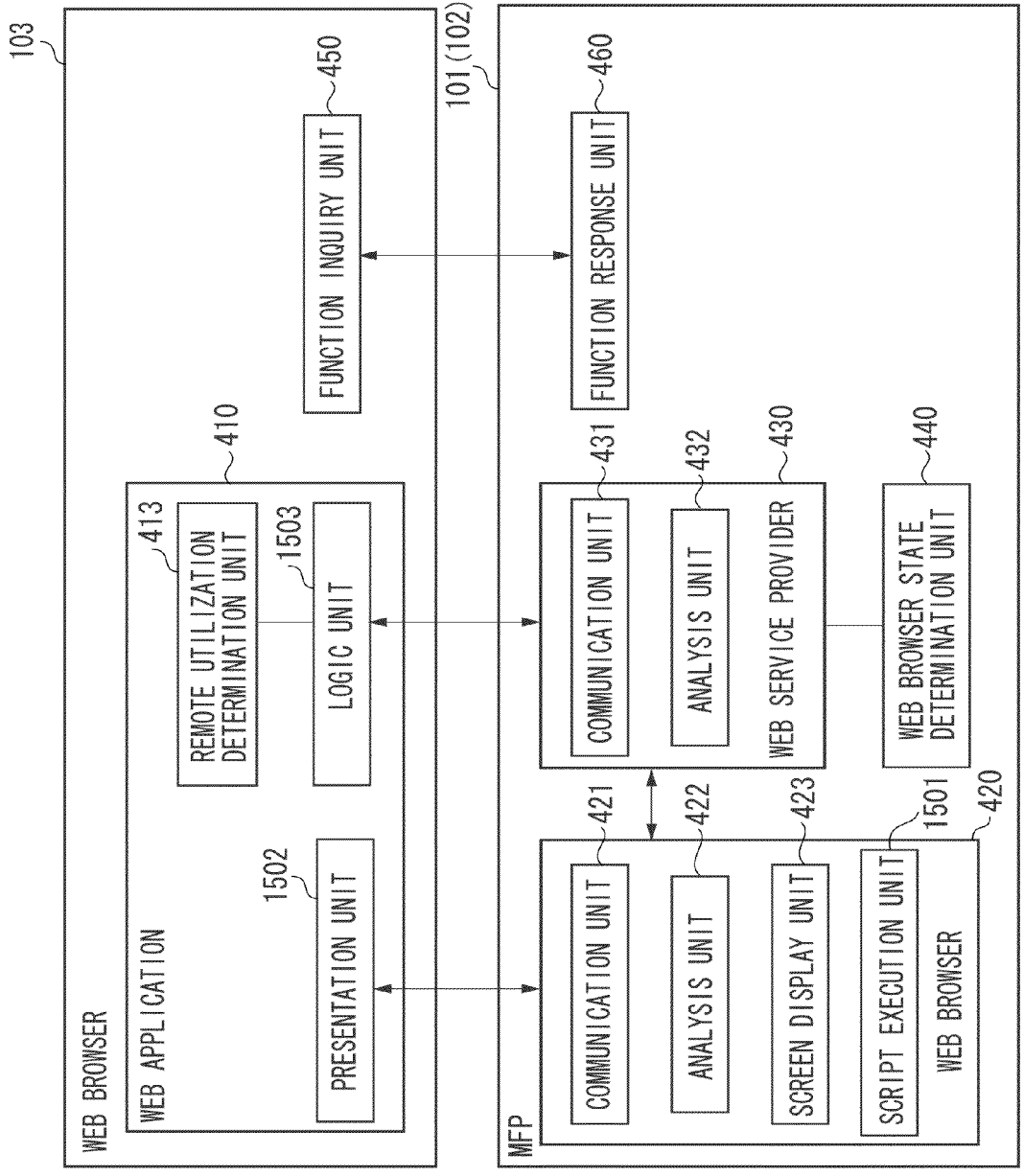
FIG. 15 is a block diagram illustrating a software configuration of an entire image processing system according to a third exemplary embodiment.

FIG. 15 illustrates a software configuration of an entire image processing system according to the present exemplary embodiment. Software functions illustrated in FIG. 15 are achieved by executing a control program with a CPU included in each of the MFP 101, the MFP 102, and the web server 103 illustrated in FIGS. 2A and 2B and FIG. 3. Components denoted by reference numerals similar to those illustrated in FIG. 4 are similar to the components illustrated in FIG. 4, and thus description thereof is omitted.

A presentation unit 1502 receives via a network I/F 315 an execution request of an image processing function of the MFP 101 or the MFP 102 made on an operation screen displayed by the web browser 420, and transmits the execution request to a logic unit 412. A logic unit 1503 then generates an execution instruction of the image processing function corresponding to the notification, and the presentation unit 1502 embeds the execution instruction as a script in a HTTP response to be transmitted to the web browser 420. The presentation unit 1502 transmits the HTTP response to the web browser 420 via the network I/F 315. The transmitted HTTP also contains an execution instruction for a remotely used MFP as a script.

A script execution unit 1501 of the web browser 420 executes the script embedded in the HTTP response transmitted from a web application 410. According to the execution result of the script, the script execution unit 1501 transmits the execution instruction of the image processing function transmitted from the web application 410 to the web service provider 430. When the HTTP response contains the script for another remotely used MFP, the script is transmitted to a web service provider 430 included in the other MFP via a network I/F 218.

FIG. 16 is a sequential diagram illustrating processing executed, in the present exemplary embodiment, when a Scan To FAX screen 930 is displayed, and a user selects the MFP 102 as a remotely used MFP, and presses an execution button 933 after setting of a document in a scanner 221.

In step S1101, the web browser 420 of the MFP 101 notifies a presentation unit 411 of the web server 103 that the execution button 933 has been pressed.

In step S1601, the logic unit 1503 generates an execution instruction of an image processing function corresponding to the notification received in step S1101, and the presentation unit 1502 embeds the execution request as a script in a HTTP response to be transmitted to the web browser 420. Concerning the generated execution instruction, not only an instruction to execute scanning to the MFP 101 but also an instruction to execute FAX transmission to the MFP 102 are embedded as scripts. The presentation unit 1502 transmits the HTTP response to the web browser 420 via the network I/F 315.

In step S1602, the script execution unit 1501 of the web browser 420 executes the script embedded in the received HTTP response. The execution instruction to the MFP 102 has been embedded as the script in the HTTP response. In this case, however, the script indicating the execution instruction to the MFP 101 is executed. According to the execution result of the script, the web service provider 430 of the MFP 101 executes scanning. The scanning is a local use for the MFP 101, and hence the determination executed by the web browser state determination unit 440 based on the state of the web browser 420 in step S1103 illustrated in FIG. 11 is also carried out in step S1602.

When the scanning is executed in step S1602, in step S1603, the script execution unit 1501 transmits the execution instruction (script) for the MFP 102 to the web service provider 430 of the MFP 102. In step S1603, image data used for FAX transmission by the MFP 102 is also transmitted as a result of the scanning.

In step S1604, the script execution unit 1501 of the MFP 102 executes the received script, and the web service provider 430 of the MFP 102 executes FAX transmission according to the execution result of the script. The FAX transmission is a remote use for the MFP 102, and hence the determination executed by the web browser state determination unit 440 based on the state of the web browser 420 in step S1103 illustrated in FIG. 11 is not carried out.

The web service provider 430 can transmit information indicating a result of the FAX transmission executed in step S1604 to the MFP 101 or the web server 103.

According to the present exemplary embodiment, the execution instruction of the image processing function to be transmitted to the web service provider 430 included in each of the MFP 101 and the MFP 102 is embedded in the response to the web browser 420 included in the MFP 101. As a result, even when the browser 103 is located outside a fire wall, communication can be carried out.

Other Embodiments

The present invention can be achieved by executing the following processing. Specifically, software (program) for achieving the functions of the exemplary embodiments is supplied to a system or an apparatus via a network or various storage media, and a computer (or CPU or Micro Processing Unit (MPU)) of the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-282230 filed Dec. 17, 2010, which is hereby incorporated by reference herein in its entirety.

What is claimed is:

1. An image processing apparatus having a web browser, comprising:

a reception unit configured to receive from the web server an execution instruction for instructing the image processing apparatus to perform image processing;

a determining unit configured to, in a case where the reception unit receives the execution instruction, determine based on a type of the received execution instruction whether or not determining processing for determining based on a state of the web browser whether or not to perform the image processing indicated by the received execution instruction is to be performed;

a first processing unit configured to, in a case where the determining unit determines that the determining processing is to be performed, perform the determining processing, and in a case where the determining unit determines that the determining processing is not to be performed, not to perform the determining processing; and a second processing unit configured to, in a case where the determining unit determines that the determining processing is not to be performed, or the image processing indicated by the received execution instruction is determined to be performed as a result of performing the determining processing, perform the image processing indicated by the received execution instruction, and in a case where the image processing indicated by the received execution instruction is determined not to be performed as the result of performing the determining processing, not to perform the image processing indicated by the received execution instruction.

2. The image processing apparatus according to claim 1, wherein the determining unit determines that the determining processing is to be performed in a case where the received execution instruction is an execution instruction generated by the web server based on a request transmitted from the image processing apparatus, and determines that the determining processing is not to be performed in a case where the received execution instruction is an execution instruction generated by the web server based on a request transmitted from another image processing apparatus different from the image processing apparatus.

3. The image processing apparatus according to claim 1, wherein the determining unit determines that the determining processing is to be performed in a case where information indicating a local use is added to the received execution instruction, and determines that the determining processing is not to be performed in a case where information indicating a remote use is added to the received execution instruction.

4. The image processing apparatus according to claim 1, wherein the first processing unit determines that the image processing indicated by the received execution instruction is to be performed in a case where the web browser is active, and determines that the image processing indicated by the received execution instruction is not to be performed in a case where the web browser is not active.

5. The image processing apparatus according to claim 1, further comprising:
a display unit,
wherein the first processing unit determines that the image processing indicated by the received execution instruction is to be performed in a case where the web browser is displayed on the display unit, and determines that the image processing indicated by the received execution instruction is not to be performed in a case where the web browser is not displayed on the display unit.

6. A method for controlling an image processing apparatus having a web browser, comprising:
receiving from the web server an execution instruction for instructing the image processing apparatus to perform image processing;
determining based on a type of the received execution instruction whether or not determining processing for determining based on a state of the web browser whether or not to perform the image processing indicated by the received execution instruction is to be performed, in a case where the reception unit receives the execution instruction;
performing the determining processing, in a case where the determining unit determines that the determining processing is to be performed, and not performing the determining, in a case where the determining unit determines that the determining processing is not to be performed; and
performing the image processing indicated by the received execution instruction, in a case where the determining unit determines that the determining processing is not to be performed, or the image processing indicated by the received execution instruction is determined to be performed as a result of performing the determining processing, and not performing the image processing indicated by the received execution instruction, in a case where the image processing indicated by the received execution instruction is determined not to be performed as the result of performing the determining processing.

7. A non-transitory computer-readable storage medium for storing a program causing a computer to implement a method for controlling an image processing apparatus having a web browser, the method comprising:
receiving from the web server an execution instruction for instructing the image processing apparatus to perform image processing;
determining based on a type of the received execution instruction whether or not determining processing for determining based on a state of the web browser whether or not to perform the image processing indicated by the received execution instruction is to be performed, in a case where the reception unit receives the execution instruction;
performing the determining processing, in a case where the determining unit determines that the determining processing is to be performed, and not performing the determining, in a case where the determining unit determines that the determining processing is not to be performed; and
performing the image processing indicated by the received execution instruction, in a case where the determining unit determines that the determining processing is not to be performed, or the image processing indicated by the received execution instruction is determined to be performed as a result of performing the determining processing, and not performing the image processing indicated by the received execution instruction, in a case where the image processing indicated by the received execution instruction is determined not to be performed as the result of performing the determining processing.

* * * * *